United States Patent
Ataman et al.

(10) Patent No.: US 12,153,206 B2
(45) Date of Patent: Nov. 26, 2024

(54) REFRACTIVE WAVEFRONT CORRECTION DEVICE

(71) Applicant: Albert-Ludwigs-Universitat Freiburg, Freiburg (DE)

(72) Inventors: Caglar Ataman, Freiburg (DE); Kaustubh Banerjee, Freiburg (DE); Pouya Rajaeipour, Freiburg (DE); Hans Zappe, Zurich (CH)

(73) Assignee: Albert-Ludwigs-Universität Freiburg, Freiburg (DE)

( * ) Notice: Subject to any disclaimer, the term of this patent is extended or adjusted under 35 U.S.C. 154(b) by 694 days.

(21) Appl. No.: 17/426,423

(22) PCT Filed: Feb. 3, 2020

(86) PCT No.: PCT/EP2020/052640
§ 371 (c)(1),
(2) Date: Jul. 28, 2021

(87) PCT Pub. No.: WO2020/157338
PCT Pub. Date: Aug. 6, 2020

(65) Prior Publication Data
US 2022/0107494 A1   Apr. 7, 2022

(30) Foreign Application Priority Data
Feb. 1, 2019   (DE) .......................... 102019102570.2

(51) Int. Cl.
*G02B 26/00*  (2006.01)
*G02B 3/12*   (2006.01)

(52) U.S. Cl.
CPC ............. *G02B 26/004* (2013.01); *G02B 3/12* (2013.01)

(58) Field of Classification Search
CPC ................................ G02B 26/004; G02B 3/12
See application file for complete search history.

(56) References Cited

U.S. PATENT DOCUMENTS

| | | | |
|---|---|---|---|
| 2007/0139748 A1 | 6/2007 | Kuiper et al. | |
| 2010/0118413 A1 | 5/2010 | Kim et al. | |
| 2012/0170134 A1* | 7/2012 | Bolis | G02B 3/14 359/666 |

FOREIGN PATENT DOCUMENTS

| | | |
|---|---|---|
| DE | 102016013023 A1 | 5/2018 |
| JP | S63229401 A | 9/1988 |
| JP | 2002303783 A | 10/2002 |
| JP | 2007526593 A | 9/2007 |
| JP | 2009186935 A | 8/2009 |
| JP | 2012137536 | 7/2012 |
| JP | 2013504778 A | 2/2013 |
| JP | 2016122117 A | 7/2016 |

* cited by examiner

Primary Examiner — James C. Jones
(74) Attorney, Agent, or Firm — Volpe Koenig

(57) ABSTRACT

The formation of compensation elements (7) on an at least partially transparent membrane (2) that provides the actuator elements (5) to compensate or neutralize unwanted deformations of the compartment (3), e.g. induced by gravity effects, and/or to generate positive (convex) deflections of a limiting membrane (14), where the plurality of actuator elements (5) and the at least one compensation element (7) are provided at a common electrode membrane (2).

15 Claims, 2 Drawing Sheets

REFRACTIVE WAVEFRONT CORRECTION DEVICE

TECHNICAL FIELD

The present invention relates to a refractive wavefront correction device for an adaptive optics system, the correction device comprising: an at least partially transparent electrode membrane, a compartment filled with a transparent optical liquid, the liquid contacting the electrode membrane, a plurality of at least partially transparent actuator elements for deflecting an optical boundary in response to a control signal indicative of a wavefront correction to be performed.

BACKGROUND

Adaptive optics (AO) is a proven technology traditionally used in ground-based telescopes for diffraction-limited imaging through turbulent media via real-time compensation of atmospheric turbulences. Numerous life-science microscopy techniques have recently been shown to achieve enhanced resolution and contrast through AO based correction of sample/illumination induced wavefront errors. However, widespread adaptation of AO in life-science microscopy is hindered by its prohibitive cost. We recently developed a refractive AO solution based on a dynamic/adaptable element to correct for arbitrary wavefront errors. A schematic depiction of this device is provided in FIG. 1. When used alongside sensorless wavefront estimation techniques, this new approach can be used to build a completely in-line AO system. It thus has the potential to significantly reduce the complexity and, therefore the cost, of AO life-science microscopy. We have realized the device and experimentally demonstrated the validity of the approach. Along the way, at least three important problems that limit the system performance were identified. These can be listed as below:

- Electrostatic actuation can only produce attractive forces, limiting the range, precision and symmetry of the wavefront correction capability of an optofluidic refractive phase modulator of the type depicted in FIG. 1.
- Due to the pull-in instability, there is a fundamental trade-off between the actuation range and the operation voltage. In the context of an electrostatically actuated refractive phase modulator, this translates to a trade-off between the correction amplitude for low order aberrations and high order aberrations.
- When such a device is operated in vertical orientation, such that the optical axis is parallel to ground, the liquid displacement due to the gravity-induced pressure gradient in the chamber adds a significant parasitic wavefront error, which is very difficult, or outright impossible, to correct solely by the actuators.

SUMMARY

The invention solves the problem of finding an improved refractive wavefront correction device that mitigates or avoids any or all of the above listed problems.

In order to achieve this, one or more features of the invention are utilized. Hence, for a refractive wavefront correction device as described in the beginning, the invention proposes that the device by characterized at least in that the electrode membrane is provided with the plurality of actuator elements and in that at least one compensation element is provided on the electrode membrane. By providing at least one compensation element on the electrode membrane, it is possible to counter unwanted deformations induced by the actuator elements alone and/or by the (e.g. gravity-induced) behavior of the optical transparent liquid in the compartment. Hence, the proposed solution according to the invention addresses the problems stated above and may contribute to resolving them at least partially.

Generally, speaking, an element can be either an actuator element or a compensation element, or both. We will address an element as an actuator element if we focus on its role in wavefront modulation. We will address an element as a compensation element if we focus on its role to compensate for unwanted deformations of the membrane.

An embodiment of the invention is characterized in that the compensation elements each cover an area that can be larger than an area covered by each of the actuator elements. Thus, forces may be generated that compensate for unwanted deformations of the membrane.

An embodiment of the invention is characterized in that the at least partially transparent electrode membrane is at least 20% or even at least 50%, larger in radius compared to an optical aperture of the device. Thus, space is provided to accommodate the balancing elements.

An embodiment of the invention is characterized in that the at least one compensation element extends at least partially laterally outside an aperture of the device. Hence, an influence of the at least one compensation element of imaging properties in an optical path defined or limited by the aperture may be mitigated or avoided.

In addition, or alternatively, the at least one compensation element may extend laterally outside the plurality of actuator elements. Thus, the compensation elements may be useful and/or used for compensating boundary effects on deformations of the compartment that are induced by any or all of the actuator elements.

An embodiment of the invention is characterized in that the plurality of actuator elements extend at least partially laterally outside the aperture. Thus, the full extent of an imaging or light guiding path defined or limited by the aperture may be used for deformations of the compartment due to addressing of actuator elements.

An embodiment of the invention is characterized in that the number of individual addressable electrodes in the plurality of actuator elements is larger than the number of compensation elements. Thus, a finer resolution may be achieved by the actuator elements than by the compensation elements.

An embodiment of the invention is characterized in that the at least one compensation element comprises at least two individually addressable electrodes, in particular distributed about the plurality of actuator elements.

An embodiment of the invention is characterized in that the at least one compensation element is formed by at least one electrode on the electrode membrane. Thus, in contrast to the case when the compensation element is a conductive liquid, in this case a localized spot for the counteraction generated by the compensation elements may be defined.

An embodiment of the invention is characterized in that the plurality of actuator elements are formed by electrodes on the electrode membrane. Hence, the actuator elements may be used to generate individual electrostatic forces to deform the compartment.

An embodiment of the invention is characterized in that the plurality of actuator elements is provided on a first side of the electrode membrane and in that at least one compensation electrode is provided on a second side of the electrode membrane opposite the first side. This embodiment is useful, inter alia, for denser electrode layouts.

Alternatively, or in addition, the plurality of actuator elements and at least one compensation electrode are provided on common side of the electrode membrane, like the first side of the electrode membrane or the second side opposite the first side. This embodiment may be used, for example, to simplify the fabrication process.

An embodiment of the invention is characterized in that the compartment is covered by a limiting membrane. Thus, the limiting membrane forms an optical interface or an optical boundary which defines optical properties of the compartment when filled with the transparent optical liquid. For example, the limiting membrane may be spaced apart from the electrode membrane. This may allow remote deformation of the limiting membrane, preferably across the compartment.

An embodiment of the invention is characterized in that the electrode membrane is attached to a substrate. Thus, the actuator and compensation elements may be arranged at a fixed position.

An embodiment of the invention is characterized in that the second side of the electrode membrane is in contact with the transparent optical liquid. In addition, or alternatively, the second side of the electrode membrane may be facing towards the limiting membrane.

An embodiment of the invention is characterized in that a ground electrode is formed outside the compartment. Thus, the ground electrode may be readily accessible and/or addressable from outside the compartment. For example, the ground electrode may be formed on a limiting membrane, e.g. the limiting membrane described elsewhere in this specification. For example, the ground electrode may be formed as a coating.

An embodiment of the invention is characterized in that the transparent optical liquid is balanced by a balancing liquid matching in density (e.g. 1-2 gr/cm$^3$) and/or differing in refractive index, e.g. by at least 0.2. This balancing may be mediated through a limiting membrane, preferably the limiting membrane described elsewhere in this specification, or the electrode membrane, or both.

An embodiment of the invention is characterized in that a ground electrode is formed outside the compartment, preferably on a limiting membrane, in particular as a conductive transparent liquid. Thus, separate ground electrodes in the form of depositions or ablations may not be necessary. Also, the transparent liquid may be provided with a refractive index that differs significantly form a refractive index of the transparent optical liquid within the compartment. The limiting membrane may then be viewed as defining an optical boundary of the compartment. If a density of the conductive transparent liquid is chosen appropriately, the conductive transparent liquid outside the limiting membrane may balance deformations of the limiting membrane due to the weight of the optical transparent liquid inside the compartment.

An embodiment of the invention is characterized in that on a second, opposing side of a substrate carrying the electrode membrane, a second plurality of actuator elements, a second compartment containing a transparent optical liquid and a second limiting membrane are formed. It can be said that the compartment described in the beginning of this specification may serve as a first compartment in this sense.

An embodiment of the invention is characterized in that the first and second compartments differ in height. Hence, different aberration modes may be corrected by the different compartments. This arrangement is analogous to the woofer-tweeter type arrangement commonly used for astronomical adaptive optics arrangements. Unlike those, both the woofer and tweeter functionalities are combined in a single device. In this regard, a woofer may be characterized as a device that has large stroke but is capable of creating only low frequency correction. Also, a tweeter may be characterized as a device that has low stroke but is capable of high frequency correction.

An embodiment of the invention is characterized in that the first compartment is configured to correct high order aberration modes. For example, this may be accomplished by configuring the compartment with low (e.g. <100 µm or <60 µm) height and large number (e.g. >50 or >67) of electrodes. The reduced compartment height ensures that the electro elements (actuator elements), which shrink in area due to limited aperture area, produce more force per unit area. Therefore, high order aberrations, which are usually small in amplitude but high in spatial frequency, can be corrected more efficiently.

In addition to this or alternatively, an embodiment of the invention is characterized in that the second compartment is configured to correct low order aberration modes. For example, this may be accomplished by configuring the compartment with large (>60 µm or >100 µm) height and low number (<100 or <67) of electrodes. The increased compartment height ensures that the available displacement range before electrostatic pull-in occurs is large. Therefore, low order aberrations, which are usually large in amplitude but low in frequency spatial frequency, can be corrected more efficiently.

An embodiment of the invention is characterized in that the plurality of actuator elements are formed by piezoelectric elements. Hence, a ground electrode is not necessary for addressing the actuator elements.

An embodiment of the invention is characterized in that the electrode membrane is suspended so that it is flexibly deformable. Thus, the electrode membrane may be deformed by actuating the actuator elements in a certain way. This is particularly advantageous if the electrode membrane acts as a limiting membrane, e.g. as described above, for the transparent optical liquid.

An embodiment of the invention is characterized in that the plurality of actuator elements is arranged outside the compartment. Hence, the actuator elements may be addressed from the outside of the compartment without the need to access the compartment.

An embodiment of the invention is characterized in that the at least one compensation element is formed by a transparent conductive liquid. Hence, a deposition process for forming the at least one compensation element may be not necessary. In addition, the transparent conductive liquid, in particular when arranged outside the compartment, may act as a weight balancing element to balance otherwise gravity-induced deformations of the (e.g. first) compartment.

An embodiment of the invention is characterized in that the electrode membrane comprises a piezoelectric material. Thus, the electrode membrane may be integrated into a layer or the full thickness of the electrode membrane. This alternative approach avoids the formation of actuator elements in the form or electrodes.

An embodiment of the invention is characterized in that at least one compartment, in particular a first and/or second compartment(s), in particular as described above, is/are closed. In particular, the compartment(s) may be closed, for instance by healing and/or sealing, after filling and/or by closing a fluidic port. With (a) closed compartment(s), it is relatively easy to achieve a push-pull deformation by using elements that can only develop a pulling force.

In addition to the above, the invention proposes the use of at least one compensation electrode in a refractive wavefront correction device according to the invention, in particular according to any of the claims directed to a refractive wavefront correction device, to compensate gravity-induced asymmetric deformations of a liquid limiting membrane. In addition, or alternatively, the invention proposes the above use to provide positive deflection of a liquid limiting membrane. This positive (convex) deflection may be directed away from the substrate.

BRIEF DESCRIPTION OF THE DRAWINGS

The invention will now be explained with reference to specific embodiments. The invention is, however, by no means limited to those embodiments. Further embodiments can be derived by combining the features of any of the claims with those of another claim or with features of the embodiments.

It is shown in

DETAILED DESCRIPTION

Figure 1:
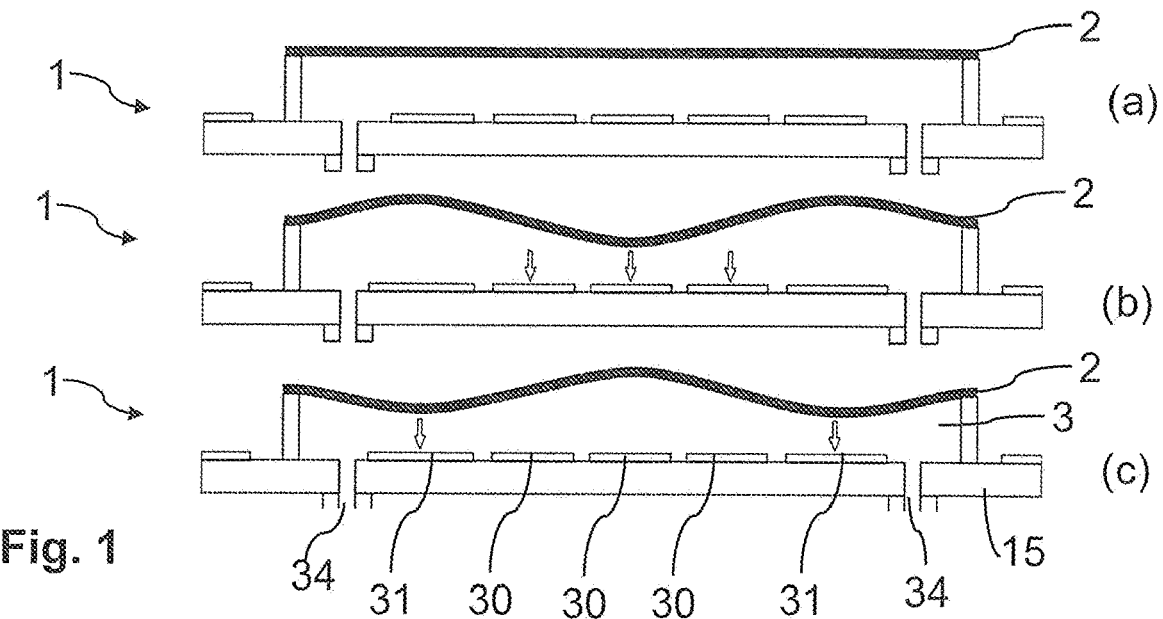
FIG. 1: (a) Schematic depiction of the optofluidic refractive phase modulator [refractive waveform correction device 1] of the known type.

FIG. 1 shows in part (a) a schematic depiction of the optofluidic refractive phase modulator [refractive waveform correction device 1] of the known type. Due to hydromechanical coupling the device attains positive defocus with center electrodes 30 of the actuator electrodes 5 actuated (b) and negative defocus with the edge electrodes 31 of the actuator electrodes 5 actuated (c).

Figure 2:
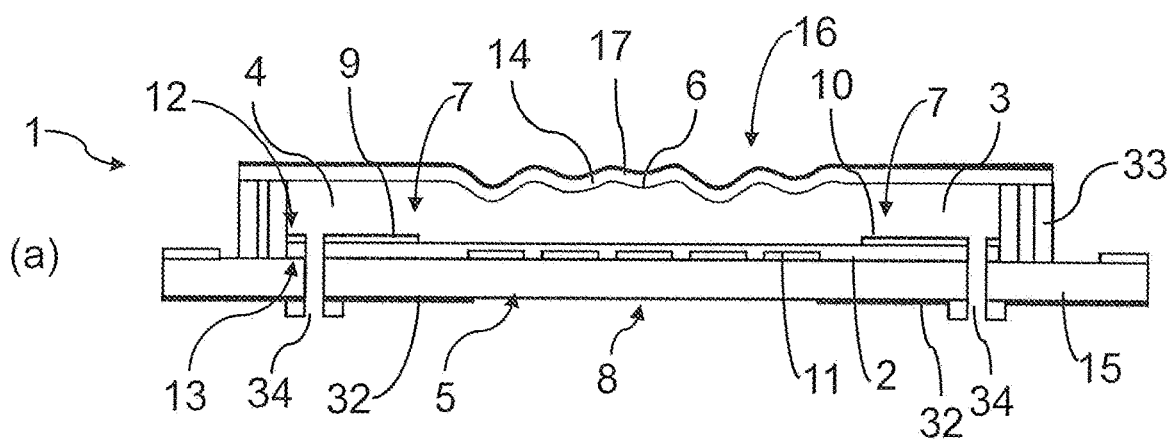
FIG. 2: The schematic depiction of the refractive wavefront modulator with two vertically stacked, spatially non-overlapping electrode sets. (a) is a cross-section view, while (b) is a top view.
Figure 2:
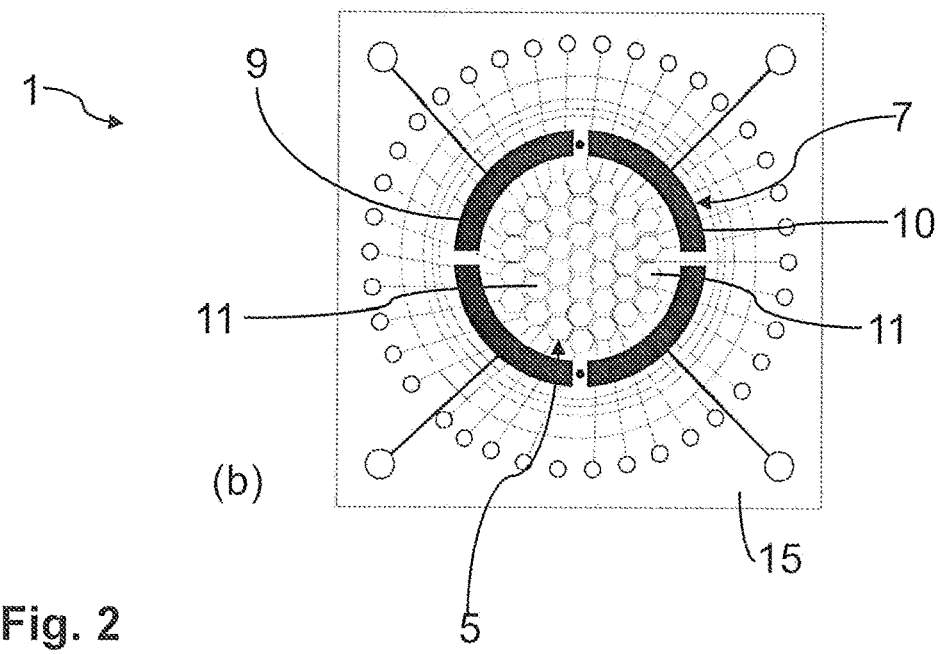

FIG. 2 is a schematic depiction of the refractive wavefront modulator [refractive waveform correction device 1] with two vertically stacked, spatially non-overlapping electrode sets [actuator elements 5 and compensation elements 7]. (a) is a cross-section view, while (b) is a top view. The inner electrodes [actuator elements 5] are up to 67 in number (37 on the schematic) and provide high-order aberration correction. They can be distributed in a hexagonal or Keystone pattern or other patterns. The outer electrodes [compensation elements 7] comprise up to 16 radially distributed electrodes (4 in the schematic) to improve range and/or fidelity of some, in fact in this example of all, aberration correction, in particular the stroke and fidelity for low-order aberration correction, particularly in the defocus and first and second spherical aberration modes. Such an arrangement enables complete push-pull-actuation, despite all the actuators [actuator elements 5] operating in attraction only. In order to accommodate the outer electrodes [compensation elements 7], the deformable membrane [the at least partially transparent electrode membrane 2] is at least 50% larger in radius compared to the optical aperture 8, as depicted in (b). A thin opaque film 32, such as iridium oxide) deposited on the backside of the device provides a precisely defined aperture area. Two electrode layers [forming the actuator elements 5 and the compensation elements 7] are electrically insulated via a thin film dielectric, such as Cytop or Parylene C. Another advantage of the outer electrodes [compensation elements 7] is apparent when the modulator [refractive waveform correction device 1] is operated vertically. They provide large correction forces that enable partial cancellation of the gravity-induced parasitic membrane deformations.

The refractive wavefront correction device 1 for an adaptive optics system has an electrode membrane 2 that is a least partially transparent. The correction device 1 has further a compartment 3 filled with a transparent optical liquid 4. The liquid 4 can be brought in and out via fluidic ports 34. After filling is completed, the ports 34 may be closed to contain the liquid.

The liquid 4 contacts the electrode membrane 2.

A plurality of at least partially transparent actuator elements 5 are formed for deflecting an optical boundary 6. This deflection is induced in response to a control signal indicative of a wavefront correction to be performed.

The electrode membrane 2 is provided with the plurality of actuator elements 5. Furthermore, on the electrode membrane 2, at least one compensation element 7.

The correction device 1 has an aperture 8 that defines and limits an optical path or a field of view.

The at least one compensation element 7 extends at least partially laterally outside of the aperture 8 of the device 1.

It can be seen from FIG. 2 (a), the at least partially transparent electrode membrane 2 extends over a region that is at least 50% larger in radius than that of the aperture 8.

In particular, the at least one compensation element 7 extends laterally outside the plurality of actuator elements 5.

The plurality of actuator elements 5 extend at least partially laterally outside the aperture 8. The main portion, however, of the plurality of actuator elements 5 lies within a space defined by the aperture 8.

The number of individual addressable electrodes 11 in the plurality of actuator elements 5 is bigger than the number of compensation elements 7.

The at least one compensation element 7 comprises at least two individually addressable electrodes 9, 10. These electrodes 9, 10 are distributed about the plurality of actuator elements 5. In the embodiment, the electrodes 9, 10 complete a full circle.

Each of the electrodes 9, 10 is larger in area than each of the electrodes 11.

The at least one compensation element 7 is formed by at least one electrode 9, 10 on the electrode membrane 2.

The plurality of actuator elements 5 is formed by electrodes 9, 10 on the electrode membrane 2.

The plurality of actuator elements 5 is provided on a first side 12 of the electrode membrane 2. The at least one compensation element 7 is provided on a second side 13 of the electrode membrane 2 opposite the first side 12.

The compartment 3 is covered by a limiting membrane 14. Limiting membrane 14 and electrode membranes 2 are spaced apart from each other by a spacer 33 and the compartment 3. It can be said that the two membranes 2, 14 define the boundaries of the first compartment 3.

The electrode membrane 2 is attached to a substrate 15. The limiting membrane 14 is flexible and is suspended on the spacer 33.

The second side 13 of the electrode membrane 2 is in contact with the transparent optical liquid 4. Also, the second side 13 of the electrode membrane 2 is facing towards the limiting membrane 14.

A ground electrode 16 is formed outside the compartment 3. This ground electrode 16 is formed on the limiting membrane 14 as a coating.

Figure 3:
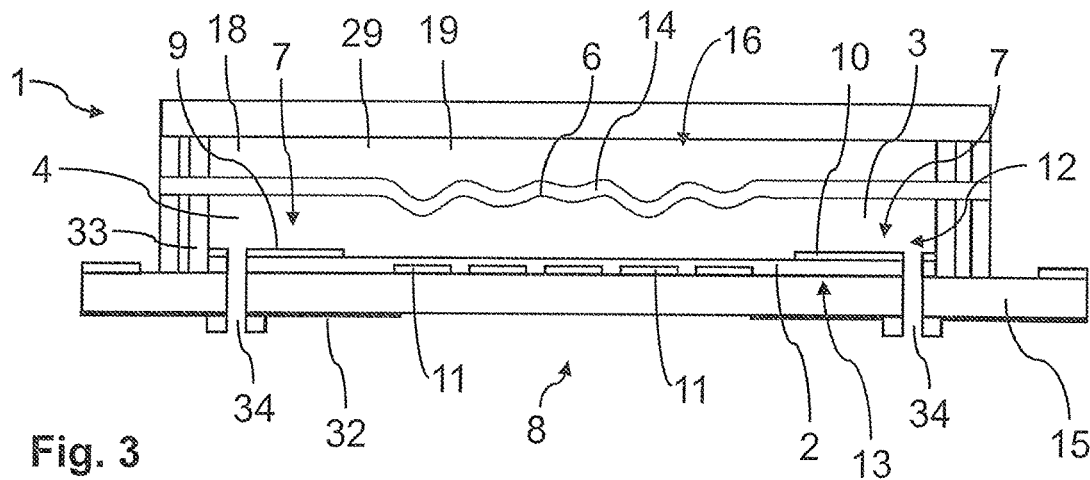
FIG. 3: An alternative arrangement that may mitigate or is inherently immune to gravity effects.

FIG. 3 shows an alternative arrangement that is inherently immune to gravity effects or may at least help mitigate those effects. Two chambers [first compartment 3 and outer compartment 29] are filled with two optical liquids [transparent optical liquid 4 and conductive transparent liquid 19] of large refractive index difference, which are matched in mass density. In addition, the top liquid 19 is electrically conductive and can act as the ground electrode 16. In other embodiments, the top liquid does not need to be conductive. A ground electrode 16 may be formed as in FIG. 2.

Turning back to FIG. 3, in a vertical arrangement of the first compartment 3, the transparent optical liquid 4 is balanced through a limiting membrane 14 by a balancing liquid 19 matching in density and contrasting in refractive index.

Thus, a ground electrode 16 is formed outside the compartment on the limiting membrane 14 as a conductive transparent liquid 19.

Figure 4:
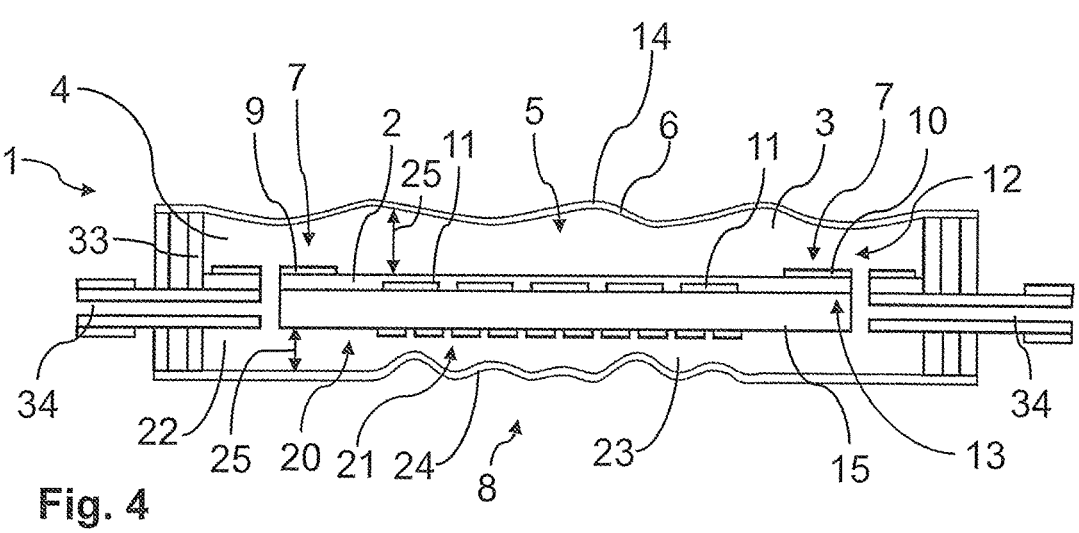
FIG. 4: A woofer/tweeter type arrangement implemented on a single substrate.

FIG. 4 shows a woofer/tweeter type arrangement implemented on a single substrate 15. The first chamber [first compartment 3] features a densely packed electrode array [actuator elements 5] and low chamber height, which significantly enhances for per unit area. This chamber [first compartment 3] is optimized to correct for high order aberrations at low to moderate amplitudes. The second chamber [second compartment 22] has a low electrode density and a high chamber height, allowing for large strokes at low order aberrations. In tandem, this arrangement eliminates the inherent stroke vs. range trade-off electrostatic actuation. Such an arrangement is particularly useful for AO microscopy, since high-order aberrations are almost always considerably smaller in amplitude compared to the low-order ones. The woofer and tweeter parts of the device can also be implemented on separate, independent substrates.

On a second, opposing side 20 of a substrate 15 carrying the electrode membrane 2, a second plurality of actuator elements 21, a second compartment 22 containing a transparent optical liquid 23 and a second limiting membrane 24 are formed. The first compartment 3 may be in fluid communication with the second compartment 22 as shown. Hence, the second transparent optical liquid 23 may be identical to the transparent optical liquid 4.

The first 3 and second compartments 22 differ in height.

The first compartment 3 is configured to correct high order aberration modes, while the second compartment 22 is configured to correct low order aberration modes.

Figure 5:
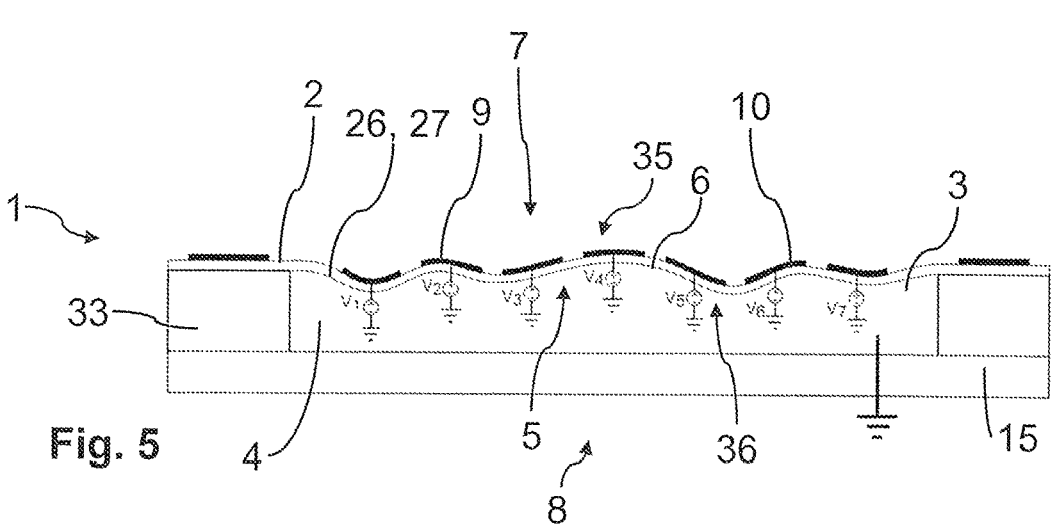
FIG. 5: An alternative actuation method for a refractive wavefront correction device according to the invention.

FIG. 5 shows an alternative actuation method for a refractive wavefront correction device 1 according to the invention: Piezoactive polymers, such as Polyvinylidenfluorid (PVDF), can also be used as actuator elements 5 to achieve a deformable membrane [at least partially transparent electrode membrane 2]. The membrane 2 comprises the piezoactive polymer being sandwiched by electrode layers 35, 36 of at least one ground electrode 16 on one side 12 of the membrane 2 and patterned signal electrodes forming at least partially transparent actuator elements 5 on the other. The individually addressable signal electrodes 11 can be used to create localized electric fields to create the required membrane 2. To simplify the membrane fabrication, the ground electrode layer 35 can be forgone in favor of using an ionic optical liquid [conductive transparent liquid 19] that is electrically grounded, as depicted in FIG. 5. Since piezoelectric actuation is bidirectional, this configuration is an alternative to the one depicted in FIG. 2.

In this embodiment, the plurality of actuator elements 5 are formed by piezoelectric elements.

The electrode membrane 2 is suspended so that it is flexibly deformable.

The plurality of actuator elements 5 is arranged outside the compartment 3.

The at least one compensation element 7 is formed by a transparent conductive liquid inside the compartment 3.

To summarize, the invention proposes to use the formation of compensation elements 7 on a at least partially transparent membrane 2 that provides the actuator elements 5 to compensate or neutralize unwanted deformations of the compartment 3, e.g. induced by gravity effects, and/or to generate positive (convex) deflections of a limiting membrane 14, where the plurality of actuator elements 5 and the at least one compensation element 7 are provided at a common electrode membrane 2.

LIST OF REFERENCE NUMERALS

1 Refractive wavefront correction device
2 at least partially transparent electrode membrane
3 (first) compartment
4 transparent optical liquid
5 at least partially transparent actuator elements
6 optical boundary
7 compensation element
8 aperture
9 electrodes of the compensation element
10 electrode of the compensation element
11 electrode of the actuator element
12 first side of the electrode membrane
13 second side of the electrode membrane
14 limiting membrane
15 substrate
16 ground electrode
17 coating
18 balancing liquid
19 conductive transparent liquid
20 second, opposing side of a substrate
21 second plurality of actuator elements
22 second compartment
23 transparent optical liquid
24 second limiting membrane
25 height
26 piezoelectric elements
27 piezoelectric material
28 positive deflection
29 outer compartment
30 center electrodes
31 edge electrodes
32 opaque film
33 spacer
34 fluidic opening
35 electrode layer
36 electrode layer

The invention claimed is:

1. A refractive wavefront correction device (1) for an adaptive optics system, the correction device (1) comprising:
   an at least partially transparent electrode membrane (2),
   a compartment (3) filled with a transparent optical liquid (4), the liquid (4) contacting the electrode membrane (2), a plurality of at least partially transparent actuator elements (5) for deflecting an optical boundary (6) in response to a control signal indicative of a wavefront correction to be performed, the electrode membrane (2) is provided with the plurality of actuator elements (5), at least one compensation element (7) is provided on the electrode membrane (2), an optical path aperture (8) that defines and limits an optical path or a field of view, and the plurality of at least partially transparent actuator elements (5) overlaps with the optical aperture (8).

2. The refractive wavefront correction device (1) according to claim 1, wherein at least one of the at least one compensation element (7) is arranged such that, together with the plurality of actuator elements (5), push- pull-actuation is enabled, or the at least one compensation element (7) and the plurality of actuator elements (5), when addressed with a same voltage, exert opposing curvatures of the optical boundary (6).

3. The refractive wavefront correction device (1) according to claim 1, wherein at least one of the at least one compensation element (7) is addressable independently of the plurality of actuator elements (5) or the at least one compensation element (7) is arranged to provide a positive membrane displacement in an optically active area through hydro-mechanical coupling.

4. The refractive wavefront correction device (1) according to claim 1, wherein the at least one compensation element (7) extends at least partially laterally outside at least one of the aperture (8) or the plurality of actuator elements (5).

5. The refractive wavefront correction device (1) according to claim 1, wherein a number of individual addressable electrodes (11) in the plurality of actuator elements (5) is larger than a number of the compensation elements (7).

6. The refractive wavefront correction device (1) according to claim 1, wherein the at least one compensation element (7) comprises at least two individually addressable electrodes (9, 10) distributed about the plurality of actuator elements (5).

7. The refractive wavefront correction device (1) according to claim 1, wherein the at least one compensation element (7) is formed by at least one electrode (9, 10) on the electrode membrane (2).

8. The refractive wavefront correction device (1) according to claim 1, wherein the plurality of actuator elements (5) are formed by electrodes (11) on the electrode membrane (2).

9. The refractive wavefront correction device (1) according to claim 1, wherein the plurality of actuator elements (5) is provided on a first side (12) of the electrode membrane (2) and the at least one compensation element (7) is provided on a second side (13) of the electrode membrane (2) opposite the first side (12).

10. The refractive wavefront correction device (1) according to claim 1, wherein at least one of the compartment (3) is covered by a limiting membrane (14), spaced apart from the electrode membrane (2), or the compartment (3) extends laterally beyond an aperture (8).

11. The refractive wavefront correction device (1) according to claim 1, wherein the electrode membrane (2) is attached to a substrate (15).

12. The refractive wavefront correction device (1) according to claim 11, wherein on a second, opposing side of a substrate carrying the electrode membrane (2), a second plurality of actuator elements (21), a second compartment (22) containing a transparent optical liquid (23) and a second limiting membrane (24) are formed.

13. The refractive wavefront correction device (1) according to claim 12, wherein at least one of the compartment (3) and second (22) compartments differ in height (25), the compartment (3) is configured to correct high order aberration modes, or the second compartment (22) is configured to correct low order aberration modes.

14. The refractive wavefront correction device (1) according to claim 1, wherein the plurality of actuator elements (5) are formed by piezoelectric elements (26).

15. The refractive wavefront correction device (1) according to claim 1, wherein the correction device (1) is configured for at least one of:

compensating gravity-induced asymmetric deformations of a liquid (4, 23) limiting membrane (14, 24), or providing positive deflection of a liquid (4, 23) limiting membrane (14, 24) in an optically active area adjacent to the at least one compensation element (7), or improving at least one of a range or fidelity of some or all aberration correction.

* * * * *